Jan. 15, 1924.
J. H. SHAW
LOCK FOR GEAR SHIFT LEVERS AND THE LIKE
Filed Nov. 21, 1919

Inventor:
John H. Shaw
By:
Henry E. Rockwell
Attorney.

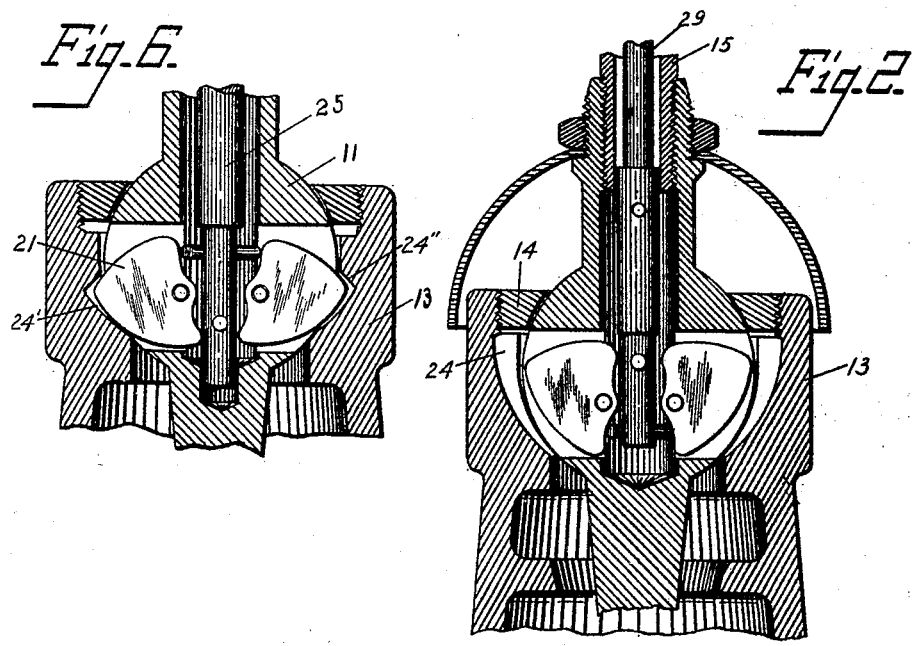
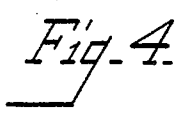

Patented Jan. 15, 1924.

1,481,033

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

Application filed November 21, 1919. Serial No. 339,538.

*To all whom it may concern:*

Be it known that I, JOHN H. SHAW, a citizen of the United States, and residing in New Haven, county of New Haven, State of Connecticut, have invented certain new and useful Improvements in Locks for Gear-Shift Levers and the like, of which the following is a full, clear, and exact description.

This invention relates to a lever lock and more particularly to key operable locking means for locking the gear shift lever of an automobile against unauthorized manipulation.

One object of my invention is to provide a gear shift lever with novel means pivoted within the lever and positioned to be rocked into and out of position to lock the lever against movement.

Another object of my invention is to provide a gear shift lever with locking means constructed to be moved into and out of locking position by the rotation of a key barrel within its cylinder lock.

To these and other ends, the invention consists in the novel features and combinations of parts to be hereinafter described and claimed.

In the accompanying drawings:

Fig. 2 is a fragmentary view of Fig. 1 showing the parts in their unlocked position.

Fig. 4 is a sectional view taken on the line 4—4 of Fig. 1 looking in the direction of the arrows.

Fig. 6 is a fragmentary vertical sectional view similar to Fig. 1, but showing a modification of my invention.

Figures 1, 3, 5:
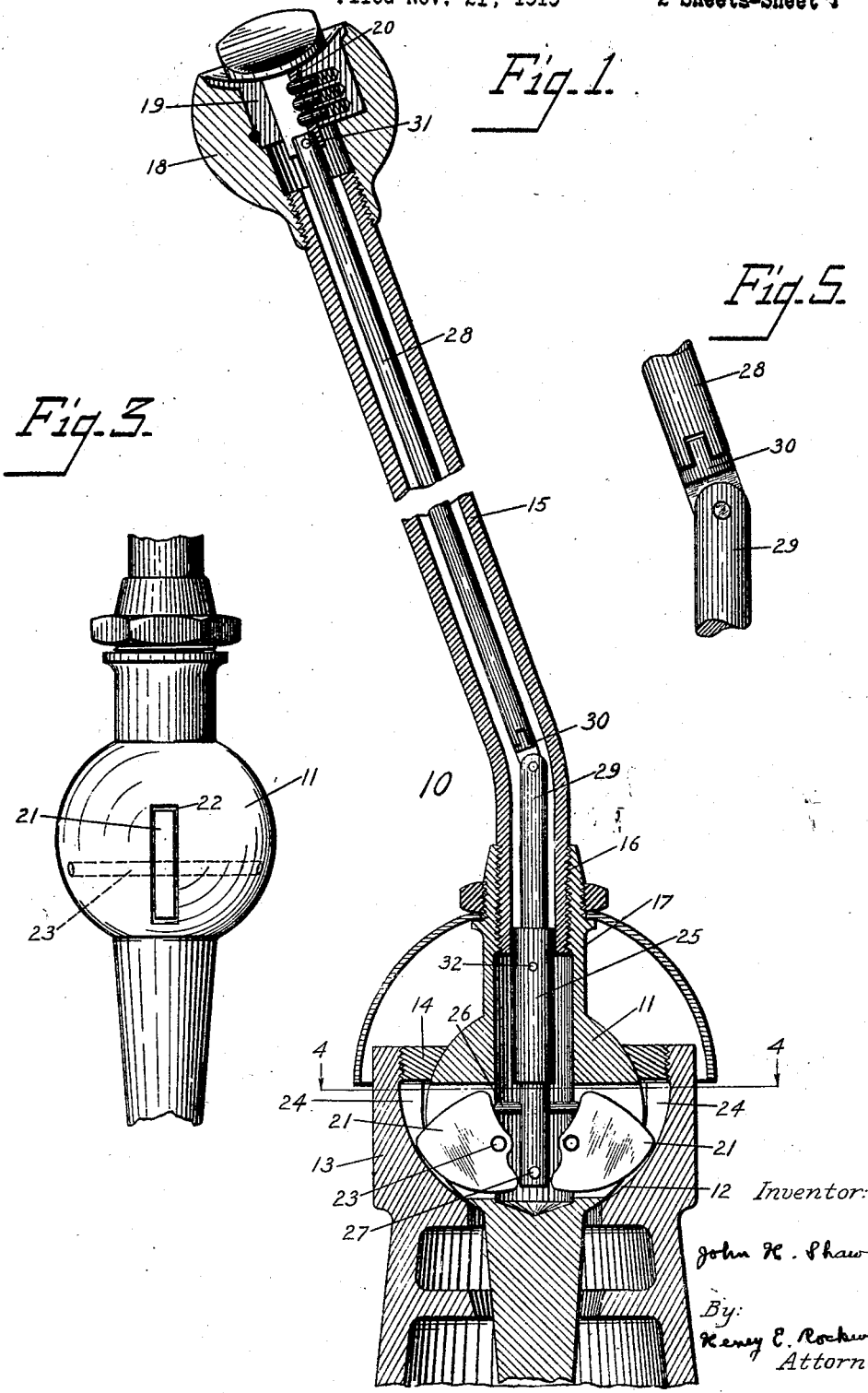
Fig. 1 is a vertical sectional view through a gear shift lever and its supporting bracket having my invention applied thereto, the parts being shown in their locked position.
Fig. 3 is a side view of an intermediate portion of my gear shift lever shown removed from its supporting bracket.
Fig. 5 is an enlarged view of a detail of my invention.

In the embodiment of my invention illustrated in the drawings, I have designated by the numeral 10 a gear shift lever of the universal swinging type, the same preferably being bent axially in order that it may be more conveniently operated by the person driving the automobile in which the same is mounted, but I desire to have it understood that I do not regard my invention as limited in its application to the particular type of lever herein disclosed.

I have shown the lever 10 as provided with a spherical bearing member 11 mounted within the curved socket 12 formed within the bracket member 13, the lever 10 being retained properly seated in this bracket member by means of a threaded ring or gland nut 14. The upper portion of the gear shift lever 10 is preferably constructed of a hollow bent tube 15, the lower end of this tube being threaded as indicated at 16 and screwed into a hollow stub shaft 17 projecting upward from the bearing member 11. The upper end of the hollow tube 15 is preferably threaded in order to receive the knob 18, and in the upper end of this knob 18 is mounted any preferred type of cylinder lock such as 19, the same being so positioned within the knob 18 that the key barrel 20 will lie in axial alignment with the tube 15.

The locking means which I have shown as mounted within the bearing member 11 of the gear shift lever consists of a pair of cams 21 pivotally mounted within the slots 22 by means of the pivot pins 23. The slots 22 are preferably arranged diametrically opposite each other and the cams 21 are positioned to lie upon opposite sides of the longitudinal axis of the gear shift lever. Within the supporting bracket 13 opposite the slots 22 are formed the slots 24, which are positioned to have a portion of the cams 21 swung outward into locking engagement with these slots. The slots 22 and 24 are of substantially the same width as the cams 21, so that these cams fit rather snugly within these slots. The cams are so constructed that when they are rocked in one direction, as shown in Fig. 1, a portion of the same will move outward into locking engagement with the slots 24, and when these cams are rocked in the opposite direction, as shown in Fig. 2, they will swing inward, so that they are entirely housed within the spherical bearing member 11.

The means which I have provided for swinging the cams 21 into and out of locking engagement with the slots 24 consists of the pin or bolt 25, which extends axially within the bearing member 11 of the gear shift lever and within the lower portion of this bolt 25 are mounted the pins 26 and 27. These pins preferably extend through the bolt 25 and project a short distance from each side of the same, as shown, and they pass through the bolt 25 at right angles to each other, as shown more particularly in Fig. 4. The pin 26 is positioned a short distance above the pivot pins 23 and the pin 27 is positioned a short distance below these pivot pins. The arrangement of the pins 26 and 27 is such that when the bolt 25 is rotated to the position shown in Fig. 1, the opposite ends of these pins 26 engage the upper portion of the cams 21 in order to rock the same about their pivots to the position shown in Fig. 1, whereas when the bolt 25 is rotated to the position shown in Fig. 2, the opposite ends of the lower pins 27 engage a portion of the cams lying below their pivot and rock these cams inward out of locking engagement with the supporting bracket to the position shown in Fig. 2. In order to operatively connect the bolt 25 to the key barrel 20, I have provided rods 28 and 29 mounted within the hollow tube 15, and in order that the curved portion of the tube 15 will not interfere with the free rotation of these rods, the adjacent ends of the same are preferably connected together by the universal joint or coupling 30. The upper end of the rod 28 is preferably rigidly secured to the key barrel 20 by means of a pin 31 and the lower end of the rod 29 may be formed integral with the bolt 25 or if desired may be secured to the same by a pin or the like 32.

The operation of my device is as follows: When it is desired to lock the gear shift lever 10 against unauthorized movement, the same is shifted to its neutral position, whereupon the key barrel 20 is rotated to its locked position, so that the pin 26 carried by the bolt 25 will rock the cams 21 outward into the slots 24. When the cams are moved into this position, as shown in Fig. 1, the gear shift lever 10 is prevented from being moved in a direction at right angles to the plane of the view shown in Fig. 1 sufficiently to operate the gears controlled by the lower end of this lever, as the cams 21 are constructed to fit rather snugly in the slots 24. And since in practically all the gear shift levers now in general use it is necessary to shift the gear controlling lever laterally before it can be moved longitudinally, it will be seen that the means just described for locking the lever against lateral displacement satisfactorily retains the same in its neutral position. When it is desired to unlock the gear shift lever 10, all that is necessary is to insert the proper key in the cylinder lock 19 in order that the key barrel 20 may be operated to rotate the bolt 25 to the position shown in Fig. 2, whereupon the cams 21 are rocked inward out of engagement with the slots 24.

In the construction shown in the modification of my device illustrated in Fig. 6, the operation is exactly the same as in the device shown in Figs. 1 to 5 inclusive, the only difference being that instead of forming the slots for the outer end of the cams 21, as in Figs. 1 to 5, these slots 24' are given substantially the configuration of the projecting nose portion of the cams, so that a shoulder or abutment 24'' is provided directly in front of the outer end of these cams when they are swung to their locking position. In this modification, by constructing the slots 24' as shown, the gear shift lever 10 is prevented from being rocked at right angles to the plane of Fig. 6, in the manner above pointed out, due to the fact that the cams 21 are snugly received in the slots 24', and in this modified construction the cam members 21 serve also to prevent the lever 10 from being rocked or shifted in the plane in which this sectional view is taken, for if it is attempted to move the lever in this last mentioned plane, the nose of the cams will about against the shoulder 24'' of the slots 24'. In this modification of my invention, the cams, when held in their extended position, prevent the gear shift lever 10 from being shifted in any direction, while in the device shown in Figs. 1 to 5 inclusive, as above pointed out the cams in themselves do not prevent the lever 10 from being rocked in the plane of the section shown in Fig. 1, but only in the plane at right angles to this section.

It will be apparent that various changes may be made in the device herein disclosed without departing from the scope of my invention as defined in the annexed claims.

What I claim is:

1. In combination with a gear shift lever or the like fulcrumed in a supporting bracket, means for locking said lever against movement, comprising a rod rotatably mounted within said lever and held against longitudinal movement therein, key-controlled means for rotating said rod, and means pivotally mounted within said lever and constructed to be rocked by the rotation of said rod either into or out of locking engagement with said bracket.

2. In combination with a gear shift lever or the like, fulcrumed in a supporting bracket, means for locking said lever against movement, comprising a rod extending longitudinally of the lever and rotatably mounted therein, key controlled means for rotating the rod, means pivotally mounted within the lever and constructed to be rocked into locking engagement with said bracket, and means upon said rod adapted to be moved by the rotation thereof into engagement with said pivotally mounted means to effect the movement thereof.

3. In combination with a gear shift lever or the like having a bearing member fulcrumed in a supporting bracket, means for locking said lever against movement, comprising a key-controlled rod rotatably mounted within said lever, means mounted within said bearing member and movable into and out of locking engagement with said bracket, and means operable by said rod for positively moving said locking means either into or out of locking position.

4. In combination with a gear shift lever or the like fulcrumed in a supporting bracket, means for locking said lever against movement, comprising a key-controlled rod rotatably mounted within said lever, means mounted within said lever and movable into and out of locking engagement with said bracket, and means operable by a partial rotation of said rod in one direction to move said locking means into locking position and operable by a partial rotation of said rod in the opposite direction to positively move said locking means out of locking position.

5. In combination with a hollow gear shift lever fulcrumed in a supporting bracket, means for locking said lever against movement, comprising adjacent slots in said lever and bracket, a cam pivotally mounted within said lever slot and positioned to be rocked into and out of locking engagement with said bracket slot, and key-controlled means for operating said cam.

6. In combination with a hollow gear shift lever fulcrumed in a supporting bracket, means for locking said lever against movement, comprising cams pivotally mounted within said lever, said supporting bracket having slots formed therein, said cams constructed to be rocked into and out of locking engagement with said slots, and key-controlled means for operating said cams.

7. In combination with a hollow gear shift lever fulcrumed in a supporting bracket, means for locking said lever against movement, comprising cams pivotally mounted within said lever and positioned to be rocked into and out of locking engagement with said bracket, and key-controlled means for operating said cams, said key-controlled means constructed to rock each of said cams in one direction by exerting pressure upon the same to one side of its pivot and to rock the same in the opposite direction by exerting pressure upon the other side of its pivot.

8. In combination with a lever fulcrumed in a supporting bracket, means for locking said lever against movement, comprising means pivotally mounted within said lever and normally retracted within the same, and key-controlled means for swinging said pivoted means into locking engagement with said bracket.

9. In combination with a pivoted lever having a spherical bearing member, means for locking said lever against movement, comprising means pivotally mounted within said bearing member, and key-controlled means for swinging said pivoted means into locking engagement with a fixed element adjacent said lever.

10. In combination with a gear shift lever or the like fulcrumed in a supporting bracket, means for locking said lever against movement, comprising a rod rotatably mounted in said lever, key-controlled means for operating said rod, and means pivotally mounted in said lever, constructed to be moved into locking engagement with said bracket upon a partial rotation of said rod.

11. In combination with a lever fulcrumed in a supporting bracket, means for locking said lever against movement including a swinging member pivoted to said lever, a rotatable rod mounted in the lever, and projections upon said rod to actuate said member in opposite directions upon rotation of said rod.

12. In a device of the character described, a fixed support, a lever movably mounted thereon, a pivoted member carried by the lever and adapted to engage the support to lock the lever against movement and means carried by the lever to engage said member upon opposite sides of its pivot to move it in opposite directions.

13. In a device of the character described, a supporting bracket, a gear shift lever movbly mounted thereon, a member pivoted to the lever and adapted to be swung into engagement with said support to lock the lever against movement, a rod rotatably mounted in the lever, and means upon said rod to engage said pivot member upon opposite sides of its pivot to move it into and out of locking position.

In witness whereof, I have hereunto set my hand on the 20th day of November, 1919.

JOHN H. SHAW.